April 5, 1960 J. H. WILES ET AL 2,931,459
LIQUID LEVEL CONTROL FOR DUST COLLECTORS
Filed Dec. 27, 1955 3 Sheets-Sheet 1

JOHN H. WILES &
CHARLES A. WATKINS
INVENTORS

BY *Connolly and Hutz*

THEIR ATTORNEYS

April 5, 1960     J. H. WILES ET AL     2,931,459
LIQUID LEVEL CONTROL FOR DUST COLLECTORS
Filed Dec. 27, 1955     3 Sheets-Sheet 2

JOHN H. WILES &
CHARLES A. WATKINS
INVENTORS

BY Connolly and Hutz
THEIR ATTORNEYS

INVENTORS
JOHN H. WILES &
CHARLES A. WATKINS

BY *Connolly and Hutz*

THEIR ATTORNEYS

2,931,459

LIQUID LEVEL CONTROL FOR DUST COLLECTORS

John H. Wiles and Charles A. Watkins, Hagerstown, Md., assignors to Pangborn Corporation, Hagerstown, Md., a corporation of Maryland Application December 27, 1955, Serial No. 555,320

9 Claims. (Cl. 183—25)

This invention relates to an improved type of liquid level control for dust collectors; and it particularly relates to a liquid level control for the so-called "wet collection" type of dust collectors.

In the operation of a dust collector of the present type, dust-laden gas, such as air, is directed into the inlet chamber of the collector where it experiences somewhat of a reduction in velocity. This reduction causes the heavier particles of dust in the gas stream to be deposited on the water surface of a liquid bath in a tank at the bottom of the collector. These particles then tend to sink to the bottom of the tank as sludge.

A venturi tube is positioned above the liquid level in the tank and connects the inlet chamber to the outlet or so-called "clean gas" chamber at the opposite side of the tank. As the dust-laden gas stream, freed from the heavier particles therein, flows into the venturi tube, the low pressure area in the venturi throat induces the liquid from the tank to enter into the high velocity gas stream passing through the venturi throat. The subsequent turbulence of the liquid, caused by its mixing with the high velocity gas stream, breaks the liquid into relatively minute particles and concurrently thoroughly mixes the dust particles in the gas stream with these liquid particles.

Floating material on the water surface is also drawn into the venturi tube by the gas and water movement and is subsequently discharged to the outlet or "clean gas" chamber.

The gas, water and sludge mixture is expelled, at high velocity, from the outlet end of the venturi tube against baffle plates or other impingement surfaces.

In operation, it has been found that the water level in the outlet chamber is generally higher than the outlet end of the venturi tube. This results in additional water being sucked up and added to the general turbulence.

The sludge, which is deposited on the impingement areas, is washed down into the tank and flows to the bottom thereof, where it settles out. It may then either be removed by hand or by any desirable form of conveyor. Such conveyor may take the form of an inclined conveyor which moves it up to the top of a sludge trough which is in fluid communication with the tank. The sludge may then be removed from this trough whenever necessary.

In order to effectively operate a device of this type, it obviously is necessary to maintain the liquid level in the tank at a proper height. Since a certain amount of the liquid is lost during sludge removal, and since certain liquids have a tendency to evaporate, it has been found necessary to replenish the liquid in the tank. This liquid replenishment is generally slightly greater than the estimated normal demand, as a safety precaution against sudden surges and unexpected losses during operation.

Various types of liquid level control devices have, heretofore, been used for the present purpose. However, all of these previous types of mechanisms had various disadvantages. Among these disadvantages was the fact that they were, in general, relatively complex, consisting of numerous compartments, baffles, weirs, pressure seals, filter screens, and the like. Another disadvantage lay in the fact that many of these previous level control mechanisms were not adjustable or adaptable to a sufficiently wide range of operating conditions.

In addition to the above disadvantages, the previous types of liquid level control mechanisms generally required frequent cleaning and servicing in order to maintain proper operation. Furthermore, their complexity often made servicing difficult and time-consuming, so that the control was often neglected and, therefore, would not function properly when necessary.

Another disadvantage of the prior types of mechanisms was the fact that there was no adequate provision made for controlling the level of the liquid during the periods when the dust collector was not in operation.

Other disadvantages were that, since there was no provision made for adjustability or, when such provision was made, it was much too limited, the resulting performance was relatively inefficient when the mechanism was operated at other than standard conditions. This was a particularly serious disadvantage because operating conditions in the field often vary over a relatively wide range.

It is, therefore, one object of the present invention to provide a liquid level control means for dust collectors which is adjustable to varying conditions so that it may perform with optimum results under all conditions of use, both during operation of the dust collector and during periods when it is not in operation.

Another object of the present invention is to provide a liquid level control means for dust collectors which is relatively simple in construction and economical both to manufacture and install.

Other objects and many of the attendant advantages of this invention will be readily appreciated as the same becomes better understood by reference to the following detailed description when considered in connection with the accompanying drawings wherein.

Figure 1:
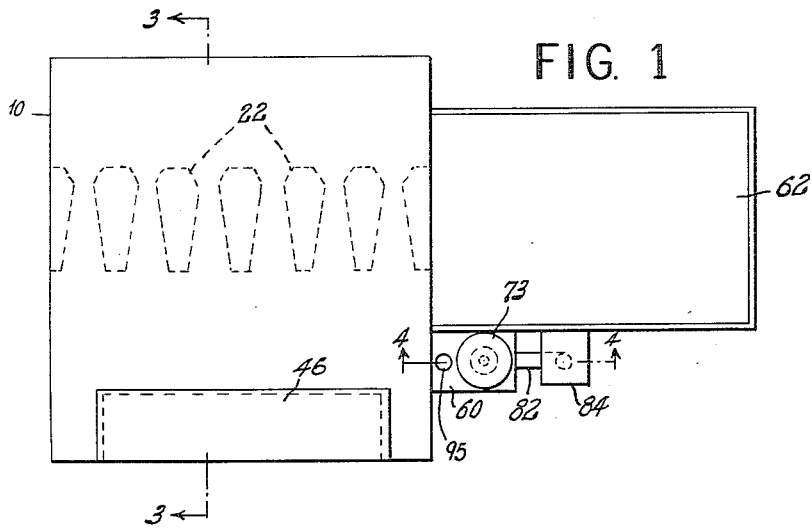
Fig. 1 is a top plan view of a dust collecting apparatus embodying the present invention.
Figure 2:
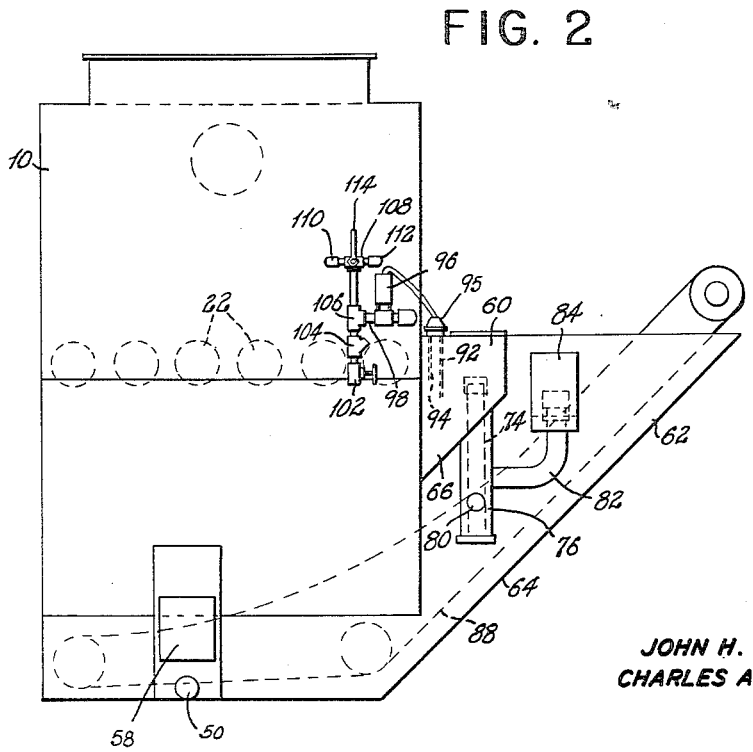
Fig. 2 is a side elevational view of the device of Fig. 1.
Figure 3:
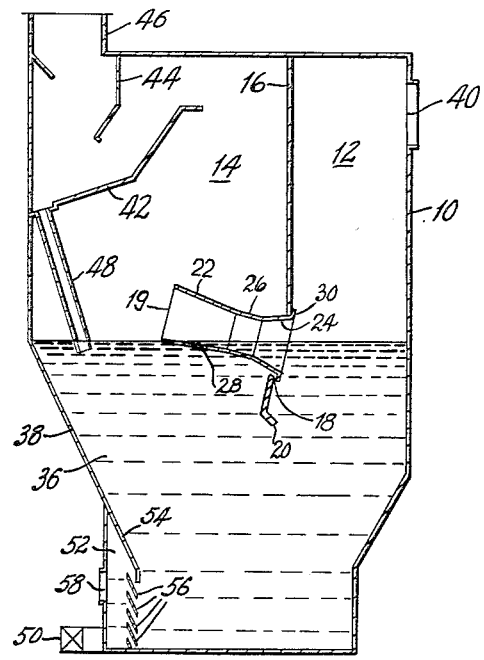
Fig. 3 is a sectional view taken on line 3—3 of Fig. 1.
Figure 4:
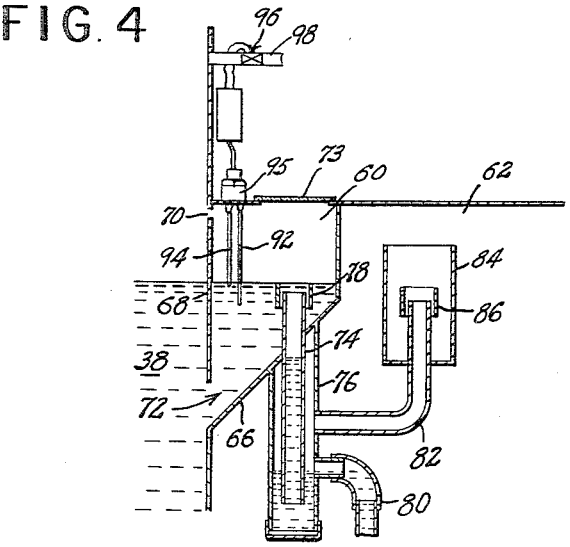
Fig. 4 is an enlarged, detailed, sectional view taken on line 4—4 of Fig. 1.
Figure 5:
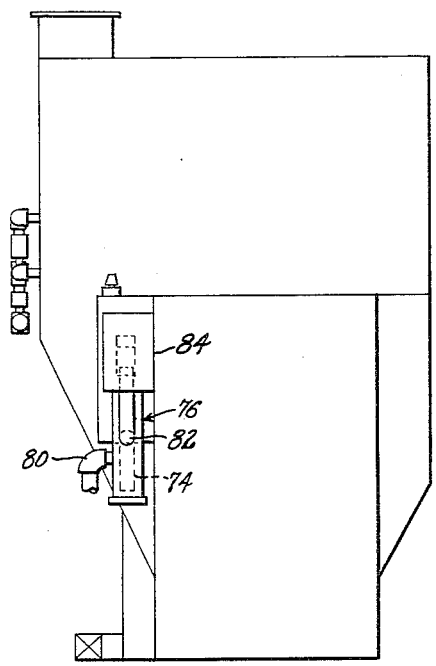
Fig. 5 is an end view of the device of Fig. 1.

Referring, now, in greater detail to the various figures of the drawings wherein similar reference characters refer to similar parts, there is illustrated a housing 10, having an inlet chamber 12 and an outlet chamber 14. The inlet chamber 12 is separated from the outlet chamber 14 by a vertical dust wall 16, having a series of apertures 18 at the lower portion thereof. A baffle flange 20 extends from the bottom end of the dust wall.

Positioned in each of the apertures 18 is a venturi tube 22. The venturi tubes are each inclined upwardly from the dust wall into the outlet chamber 14 and each of these tubes includes an inlet portion 24, at the dust wall, a constricted throat portion 26 and an enlarged outlet portion 28. The inlet portion is provided with a lateral flange 30 which overlies and is connected to the dust wall 18 by any desired means. A liquid bath 36 is provided in a tank 38 at the bottom of the housing.

An inlet opening 40 is provided at the upper portion of the inlet chamber 12 and is adapted to be connected either directly to atmosphere or to a suitable system of dust collecting conduits.

The outlet chamber is provided with a series of baffle plates 42 which coact with other baffle plates 44 depending from the inner top surface of the housing to form a somewhat tortuous passage for the clean air that flows out from the outlet chamber 14 through the outlet opening 46. A liquid return pipe 48 depends from the lower portion of the baffle plate assembly 42. This return pipe is inclined slightly inward and the outlet end is positioned below the surface of the liquid bath.

At the bottom of the tank portion 38, there is provided a drain 50. This drain 50 leads out from a drain box 52 which is formed by an inclined top baffle plate 54, in conjunction with a series of inclined lower baffle plates 56. An access door 58 is provided for the purpose of permitting manual cleaning out of the drain box.

At one side of the housing 10 is provided a liquid level control chamber 60, and forwardly of this control chamber 60, there is provided a trough 62 having an inclined outer wall 64 extending up from the tank.

The chamber 60 is provided with an inclined bottom wall 66, connecting with the tank 38, and is separated from the tank 38 by a vertical wall 68, which has an upper opening 70, above the normal level of the liquid bath, and a lower opening 72 below the level of the liquid bath. A transparent access and inspection door 73 is provided at the top of the chamber 60.

An overflow pipe 74 has its upper end positioned within the chamber 60, and extends through the inclined wall 66 into a closed housing 76. The upper portion of the pipe 74, within chamber 60, is provided with a telescoping extension 78, by means of which, the inlet opening of the drain pipe can be raised or lowered to any desired level.

The housing 76 is provided with a lateral drain pipe 80 at its lower portion, while spaced above the drain pipe 80, is an elbow pipe 82 which extends into a housing 84. The housing 84 is positioned laterally of the housing 60 adjacent the trough 62, as best shown in Fig. 1. The upper end of the pipe 82, within the housing 84, is also provided with a telescoping member 86 for adjustment of the upper end of this pipe.

A sludge conveyor, generally indicated at 88, is arranged at an inclined angle between the bottom of the tank 38 and the upper portion of the trough 62. This conveyor acts to move the sludge deposited at the bottom of the tank up to the top level of the trough 62 from where it may be removed. This structure is generally conventional and has, therefore, not been illustrated in detail.

Extending into the control chamber 60 are a pair of electrodes 92 and 94, mounted on the top wall by a coupling member 95. These electrodes are electrically connected through relays to a solenoid operated valve 96, positioned in the valve housing 98. The electrode 92, it should be noted, depends to a lower level than does the electrode 94.

The liquid is supplied from the source thereof through a manually operated shut-off valve 102. From there it flows through a strainer 104 and, through a coupling 106, to a manifold 108. The manifold 108 has two re-fill conduits 110 and 112, conduit 110 being for ordinary liquid feed and the conduit 112 for rapid filling. A three-way valve is provided in the manifold and may be actuated to either the ordinary or rapid fill by a handle 114. When the handle is in the intermediate position, the filling conduit is entirely closed.

The housing 98, containing solenoid valve 96, is connected into the liquid supply line by coupling 106.

The liquid supply may either be manually operated through handle 114 or the handle may be moved to place the three-way valve in closed position and the liquid supply may then be controlled through the solenoid valve.

In the operation of the device, the dust-laden gas is directed through the inlet opening 40 into the inlet chamber 12. Passing downwardly, the gas impinges against the surface of the liquid bath. The impact of the gas depresses the liquid level in the chamber 12 and this causes the liquid level to rise in the chamber 14. Some of the liquid is entrained by the gas and is carried into the venturi tubes where intimate contact and wetting of the dust particles by the liquid droplets occurs.

The gas and wetted dust pass from the venturi tubes into the chamber 14 where the wetted dust and liquid are de-entrained from the gas by impingement against the baffle plate assembly 42, as well as by impingement against the walls of the outlet chamber.

The de-entrained dust and liquid then run down into the liquid bath. The liquid, which is removed from the gas stream as it flows between the baffles 42 and 44, is returned to the liquid bath through the conduit 48 while the cleaned gas leaves the collector through outlet 46.

Dirt in the liquid settles to the bottom of the tank 38 where it is either manually or mechanically removed as by means of the conveyor 88.

As was noted above, a certain amount of the liquid is lost either by evaporation or during the sludge removal processes. Additional liquid is therefore introduced through the conduits 110 or 112 either by manual means, as by actuation of the three-way valve by handle 114, or by means of the solenoid valve.

The solenoid valve is actuated by means of the electrodes 92 and 94 in the chamber 60. The electrode 92 depends to the standing level of the liquid whereas electrode 94 depends only to the operating level of the liquid.

The solenoid valve 96 is normally maintained in closed position. This closed position is in effect when either of the electrodes is immersed in the liquid. While the device is operating, if the liquid falls below the level of the electrode 94, the solenoid valve will open to admit make-up liquid and this flow will continue until the liquid reaches the level of the electrode 94. During shut-down, when the device is not in operation, if the liquid falls below the level of the electrode 92, the solenoid valve will open and make-up liquid will flow into the tank until the level of the liquid reaches the electrode 92.

The liquid in the chamber 60 is maintained at the level of the liquid in the tank by means of the port 72, underneath the surface of the liquid, and the port 70, above the surface of the liquid. The port 70 acts to equalize the pressure above the liquid between the tank and the chamber 60.

In order to maintain the liquid level at an optimum height, both during operation and shut-down, a liquid level control is provided. The control which is used during operation comprises the overflow pipe 74, extending through the bottom wall of the chamber 60 into the housing 76. The height of the overflow pipe 74 may be adjusted, as desired by adjusting the telescoping sleeve 78 at the top of the pipe. This adjustment assures the maintenance of an optimum liquid level in the chamber 60, as well as in the outlet chamber 14, during operation.

Liquid overflowing into the pipe 74 passes down into the bottom of the housing 76. This forms a trap at the bottom of the housing 76 which seals the system, thereby preventing backflow of gas and uneven discharge of liquid.

In order to maintain the liquid level at an optimum level during shut-down, there is provided the overflow pipe 82. The pipe 82 has its upper end positioned in the housing 84, which is in fluid communication with the sludge trough 62. The communication between the housing 84 and the sludge trough is provided because, under suction operation, the liquid level in the sludge trough drops; and rises when the collector is shut down. Since the pipe 82 is a standing-level overflow pipe, its upper end is located in the housing 84 which is open to atmosphere in order to prevent drain-off of liquid from the wrong overflow pipe during collector operation. This results from the fact that, since the liquid level drops in the trough during suction operation and rises when the device is shut down, the overflow will take place through pipe 82 only when the "standing" level of the liquid is greater than desired, and will not be effected by the "operating" level.

The above description applies to suction-operation conditions. If, however, instead of suction, pressure is used to force the dust-laden gas through the dust collector, then the housing 84 would have to be closed to atmosphere and would be in fluid connection with the inlet chamber.

Just as in the case of the operating-level overflow pipe 74, the standing-level overflow pipe 82 is provided with a telescoping sleeve 86 in order that the height of the standing-level overflow pipe may be so adjusted during periods when the collector is shut down, that the liquid level is maintained at a point where maximum collection efficiency will be obtained as soon as the collector is started up.

Figure 6:
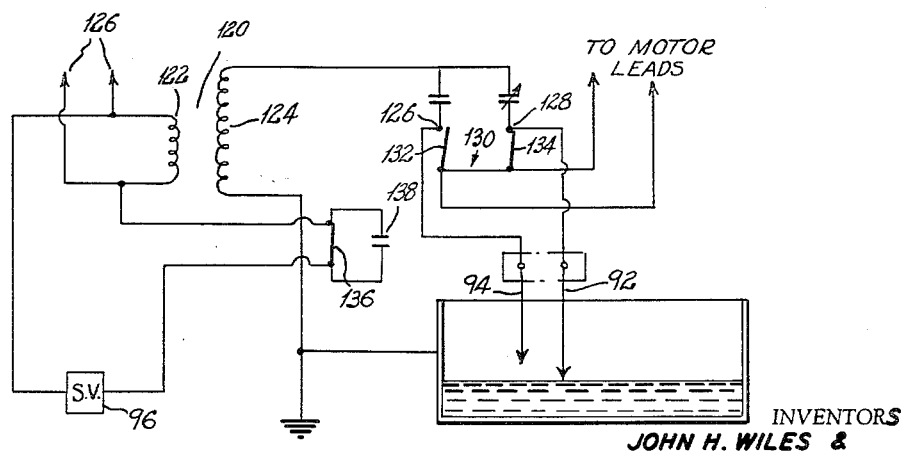
Fig. 6 is a schematic view of the electrical control network for automatically refilling the tank when necessary.

The electrical control network for operating the solenoid valve 96, both during operation and during shutdown, is illustrated in Fig. 6, which shows a circuit including a transformer 120 having a primary coil 122 and a secondary coil 124.

One side of the secondary coil 124 is grounded and is connected to the collector housing. The other side of secondary coil 124 passes through the contacts 126 and 128 of relay 130 and thence to either the standing or operating low-level electrodes 92 or 94. Relay 130 has one normally open contact blade 132 and one normally closed contact blade 134. These contact blades are operated by a coil, not shown, in the exhauster circuit. This coil acts to reverse the positions of the contact blades 132 and 134 when energized during the operation of the exhauster.

The relay 130 serves to transfer either the electrode 92 or 94 to the circuit of secondary coil 124, depending on whether the exhauster is in operation or not. Electrode 92 is connected in the circuit when the exhauster is off, whereas electrode 94 is connected in the circuit when the exhauster is on.

With power on the primary coil 122 of the transformer 120, and with no contact between the liquid in the collector and that electrode which is connected in the circuit of coil 124, the contact 136, connected in circuit with the normally closed solenoid valve 96, remains closed and the solenoid valve 96 is opened to admit liquid to the housing.

When the liquid makes contact with that one of the electrodes which is connected in the circuit, the secondary coil 124 causes contact 136 to open. This de-energizes the solenoid valve which then closes to prevent further flow of liquid to the housing.

A condenser 138 is connected across the points of the contact 136 in order to decrease chatter and to thereby increase the operating life of the contact.

It should be clear that the liquid control system described above is not limited to use in a dust collector. On the contrary, this control system can be used in conjunction with any fluid containing apparatus in order to control the amount of such fluid therein.

Obviously many modifications and variations of the present invention are possible in the light of the above teachings. It is, therefore, to be understood that within the scope of the appended claims the invention may be practiced otherwise than as specifically described.

What is claimed is:

1. A wet dust collector comprising a housing having a first chamber and a second chamber therein, said chambers being separated from each other by a vertical wall depending from the top of said housing to a predetermined position spaced from the bottom of said housing, a venturi passage connecting said chambers through said wall, said passage extending from a position in said first chamber which is below a predetermined liquid level to a position in said second chamber which is above said predetermined level, a gas inlet in said first chamber above said predetermined level and a gas outlet in said second chamber above said predetermined level, said inlet, outlet and venturi passage being so arranged relative to each other that the path of flow of a gas therethrough is tangential to said predetermined level within said first chamber and lies above said predetermined level in said second chamber, whereby a gas following said path will impinge against a liquid bath maintained at said predetermined level in both chambers and depress the level of said bath in said first chamber with a consequent rise in the level of the bath in said second chamber, and a liquid level control means for maintaining the liquid level in said second chamber at an optimum level during operation, said liquid level control means comprising a control chamber in fluid connection with said second chamber in a manner to maintain equality between the liquid levels of said second chamber and said control chamber, and an overflow pipe having its upper end positioned within said control chamber and its lower end positioned within a liquid seal construction.

2. The device of claim 1 wherein said upper end of said overflow pipe is vertically adjustable within said control chamber.

3. The apparatus of claim 1 wherein said control chamber is provided with electrical sensing means, said sensing means being electrically connected to a solenoid-operated valve in a liquid supply conduit for supplying liquid to said tank, said valve being normally closed when said sensing means is in contact with the liquid in said control chamber, and being actuatable into the open position when said sensing means loses contact with the liquid in said control chamber.

4. A wet dust collector comprising a housing having a first chamber and a second chamber therein, said chambers being separated from each other by a vertical wall depending from the top of said housing to a predetermined position spaced from the bottom of said housing, a venturi passage connecting said chambers through said wall, said passage extending from a position in said first chamber which is below a predetermined liquid level to a position in said second chamber which is above said predetermined level, a gas inlet in said first chamber above said predetermined level and a gas outlet in said second chamber above said predetermined level, said inlet, outlet and venturi passage being so arranged relative to each other that the path of flow of a gas therethrough is tangential to said predetermined level within said first chamber and lies above said predetermined level in said second chamber, whereby a gas following said path will impinge against a liquid bath maintained at said predetermined level in both chambers and depress the level of said bath in said first chamber with a consequent rise in the level of the bath in said second chamber, and a liquid level control means for maintaining the liquid level in said second chamber at an optimum level during operation, said liquid level control means comprising a control chamber in fluid connection with said second chamber in a manner to maintain equality between the liquid levels of said second chamber and said control chamber, an overflow pipe having its upper end positioned within said control chamber and its lower end positioned within a liquid seal construction, and a receptacle mounted in fluid communication with the bottom portion of said housing below said predetermined level, said receptacle being in fluid communication with said liquid seal construction through a second overflow pipe, said second overflow pipe extending into said receptacle from the bottom thereof.

5. The device of claim 4 wherein said receptacle is open to the atmosphere.

6. The device of claim 4 wherein said receptacle is closed to the atmosphere.

7. The device of claim 4 wherein said second overflow pipe is vertically adjustable within said receptacle.

8. In combination, a housing having a first chamber and a second chamber separated from each other by a vertical wall, passage means between said chambers at a predetermined level within said housing, means for maintaining a body of liquid within said housing above said predetermined level, said body of liquid being common to both said chambers as a result of intercommunication between said chambers through said passage means, a fluid inlet opening in said first chamber above said predetermined level and a fluid outlet opening in said second chamber above said predetermined level, and means for maintaining a predetermined relationship between the liquid levels in said first and second chambers, said means comprising a control chamber in fluid communication with said second chamber, an overflow pipe having its upper end positioned within said control chamber and its lower end positioned within a liquid seal construction, and an electrical sensing means, said sensing means being electrically connected to a solenoid-operated valve in a liquid supply conduit for supplying liquid to said housing, said valve being normally closed when said sensing means is in contact with the liquid in said control chamber, and being actuatable into the open position when said sensing means loses contact with the liquid in said control chamber.

9. An automatic washing tank combination having a plurality of tank portions holding washing liquid at critical levels, and in which the liquid levels change under different conditions, said combination having an automatic liquid level control including a first adjustable overflow pipe in a chamber communicating with and hydrostatically equivalent to a portion of the tank where the liquid level is to be kept higher during one operating condition than during a second condition, to overflow liquid from that portion only when the level in that tank portion is above the overflow pipe during said one operating condition, and a second adjustable overflow pipe in a chamber communicating with and hydrostatically equivalent to a portion of the tank where the liquid level is to be kept lower during said one operating condition than during said second condition, to overflow liquid from the last-mentioned portion only when the level in the last-mentioned portion is above the second overflow pipe during said second condition, both overflow pipes being connected for discharging the overflow during both conditions.

References Cited in the file of this patent

UNITED STATES PATENTS

| | | |
|---|---|---|
| 317,734 | Cothren | May 12, 1885 |
| 416,048 | Brickenstein et al. | Nov. 26, 1889 |
| 805,653 | Lowe | Nov. 28, 1905 |
| 1,346,898 | Kingsbury | July 20, 1920 |
| 1,820,981 | Le Fever | Sept. 1, 1931 |
| 1,877,296 | Goldberg | Sept. 13, 1932 |
| 2,385,161 | Pinkerton | Sept. 18, 1945 |
| 2,399,629 | Fisher | May 7, 1946 |
| 2,459,635 | Fenn | Jan. 18, 1949 |
| 2,585,440 | Collins | Feb. 12, 1952 |
| 2,763,284 | Davenport | Sept. 18, 1956 |
| 2,767,806 | Blake | Oct. 23, 1956 |